United States Patent
Al et al.

(10) Patent No.: US 12,225,421 B2
(45) Date of Patent: Feb. 11, 2025

(54) METHOD OF A SERVING CELL MEASUREMENT OBJECT CONFIGURATION

(71) Applicant: ZTE Corporation, Guangdong (CN)

(72) Inventors: Jianxun Al, Guangdong (CN); Jing Liu, Guangdong (CN); Na Liu, Guangdong (CN); Mengjie Zhang, Guangdong (CN); Zhuang Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/882,192

(22) Filed: Sep. 11, 2024

(65) Prior Publication Data
US 2025/0008394 A1  Jan. 2, 2025

Related U.S. Application Data

(63) Continuation of application No. PCT/CN2022/109211, filed on Jul. 29, 2022.

(51) Int. Cl.
*H04W 36/00* (2009.01)

(52) U.S. Cl.
CPC ... *H04W 36/0094* (2013.01); *H04W 36/0033* (2013.01)

(58) Field of Classification Search
CPC ............ H04W 36/0033; H04W 36/08; H04W 36/087; H04W 36/00837; H04W 36/0094; H04W 36/26; H04W 36/0055; H04W 36/0058; H04W 36/0072
See application file for complete search history.

(56) References Cited

U.S. PATENT DOCUMENTS

| | | | |
|---|---|---|---|
| 2021/0176656 A1* | 6/2021 | Sang | H04W 36/302 |
| 2022/0287102 A1* | 9/2022 | Futaki | H04W 76/27 |
| 2022/0394533 A1 | 12/2022 | Jin et al. | |
| 2023/0199521 A1* | 6/2023 | Cui | H04W 24/02 370/329 |
| 2023/0308914 A1* | 9/2023 | Islam | H04L 5/0094 |
| 2024/0163749 A1* | 5/2024 | G?rsu | H04W 16/28 |

(Continued)

FOREIGN PATENT DOCUMENTS

| | | |
|---|---|---|
| WO | 2019096398 A1 | 5/2019 |
| WO | 2021190364 A1 | 9/2021 |

OTHER PUBLICATIONS

International Search Report and Written Opinion issued in International Patent Application No. PCT/CN2022/109211, dated Dec. 20, 2022, 7 pages.

(Continued)

*Primary Examiner* — Allahyar Kasraian
(74) *Attorney, Agent, or Firm* — Perkins Coie LLP

(57) ABSTRACT

The present document describes methods, systems, and devices for configuring a measurement object in a wireless communication network. A plurality of candidate serving cell measurement object (MO) identifiers (IDs) are provided from a centralized unit (CU) to a distributed unit (DU). A a serving cell MO is selected by the DU from the plurality of candidate serving cell MO IDs to be used for a user equipment (UE). A per-bandwidth part (BWP) serving cell MO configuration is configured by the DU according to the serving cell MO.

16 Claims, 4 Drawing Sheets

(56) References Cited

U.S. PATENT DOCUMENTS

2024/0172022 A1* 5/2024 Zheng .................... H04W 4/02
2024/0284271 A1* 8/2024 Goyal ................ H04W 36/087

OTHER PUBLICATIONS

Ericsson, "Overlapping bands handling," 3GPP TSG-RAN3 #108-e, R3-203380, Jun. 1-12, 2020, Online, 3 pages.
Zte (moderator), "Summary of Offline Discussion on the Overlapping Band Handling over F1," 3GPP TSG-RAN WG3 #110-e, R3-206848, Online, Nov. 2-12, 2020, 3 pages.
Ericsson (Rapporteur), "Email discussion report for [Pre117-e][105][RedCap] CP open issues," 3GPP TSG-RAN WG2 #117-e, Tdoc R2-2203502, Electronic meeting, Feb. 21-Mar. 3, 2022, 45 pages.
3GPP TS 38.473 V16.10.0 (Jun. 2022), Technical Specification, 3rd Generation Partnership Project; Technical Specification Group Radio Access Network; NG-RAN; F1 application protocol (F1AP), (Release 16), 474 pages.

* cited by examiner

METHOD OF A SERVING CELL MEASUREMENT OBJECT CONFIGURATION

CROSS REFERENCE TO RELATED APPLICATIONS

This application is a continuation of International Patent Application No. PCT/CN2022/109211, filed on Jul. 29, 2022, the disclosure of which is incorporated herein by reference in its entirety.

TECHNICAL FIELD

The present subject matter is directed generally to wireless communications. Particularly, the present subject matter relates to methods, devices, and systems for configuring a measurement object in a wireless communication network.

BACKGROUND

Measurements may be useful to determine properties of wireless networks under a given configuration. Measurements may inform the decisions of wireless participants, such as a user equipment and base station, such that resources are better managed and quality of service is improved. As present measurement techniques in wireless communication systems suffer from a variety of drawbacks, limitations, and disadvantages, there is a need for inventive systems, methods, components, and apparatuses described herein.

SUMMARY

The present subject matter is directed to a method, device, and system for improving measurement techniques in wireless communication. Specifically, the present subject matter relates to configuring bandwidth part (BWP) including non-cell defining synchronization signal block (NCD-SSB). Techniques for configuring measurement configuration after BWP including NCD-SSB are disclosed.

In some embodiments, a method for measurement configuration in a wireless communication network includes providing a plurality of candidate serving cell measurement object (MO) identifiers (IDs) from a centralized unit (CU) to a distributed unit (DU); selecting, by the DU, a serving cell MO from the plurality of candidate serving cell MO IDs to be used for a user equipment (UE); and configuring, by the DU, a per-bandwidth part (BWP) serving cell MO configuration according to the serving cell MO.

In some embodiments, a method for measurement configuration in a wireless communication network, includes transmitting a message from a DU to a CU that indicates a BWP configuration information of a UE; transmitting, by the CU, a serving cell MO configuration to the DU; and configuring, by the DU, a serving cell MO identifier for the UE according to the serving cell MO configuration.

In some embodiments, a method for measurement configuration in a wireless communication network, including transmitting, by a CU, a UE context setup response message to a DU, wherein the UE context setup response message comprises at least one of: dedicated system information delivery is needed; an active downlink BWP does not include a CD-SSB; the active downlink BWP is not configured with a common search space for system information reception; or the active downlink BWP is a reduced capacity (RedCap)-specific initial downlink BWP.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

DETAILED DESCRIPTION

The present subject matter will now be described in detail hereinafter with reference to the accompanied drawings, which form a part of the present subject matter, and which show, by way of illustration, specific examples of embodiments. Please note that the present subject matter may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures, or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
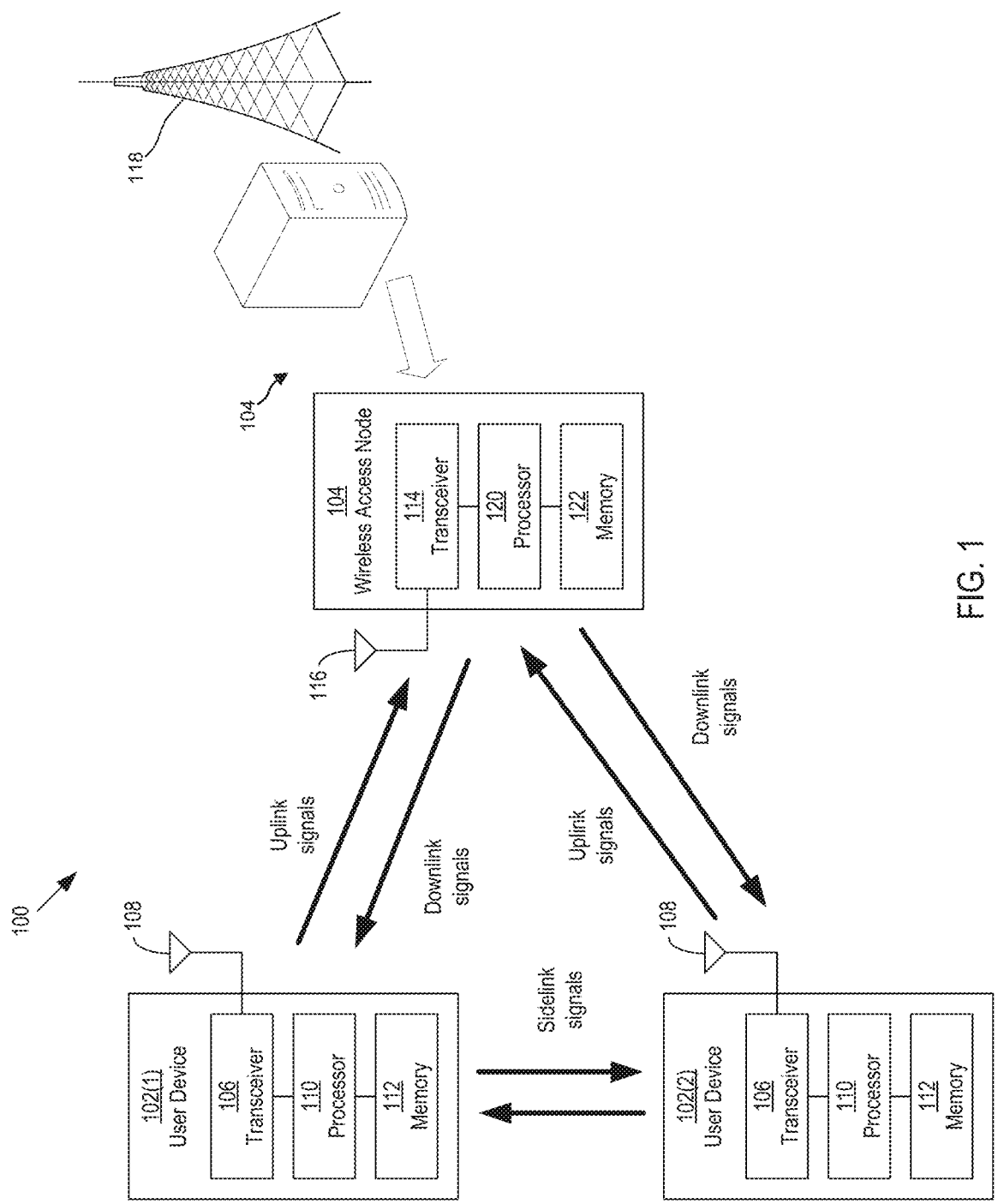
FIG. 1 shows an example of a wireless communication system include one wireless base stations and one or more user equipment.

FIG. 1 shows a diagram of an example wireless communication system 100 including a plurality of communication nodes (or just nodes) that are configured to wirelessly communicate with each other. In general, the communication nodes include at least one user device 102 and at least one wireless access node 104. The example wireless communication system 100 in FIG. 1 is shown as including two user devices 102, including a first user device 102(1) and a second user device 102(2), and one wireless access nodes 104. However, various other examples of the wireless communication system 100 that include any of various combinations of one or more user devices 102 and/or one or more wireless access nodes 104 may be possible.

In general, a user device as described herein, such as the user device 102, may include a single electronic device or apparatus, or multiple (e.g., a network of) electronic devices or apparatuses, capable of communicating wirelessly over a network. A user device may comprise or otherwise be referred to as a user terminal, a user terminal device, or a user equipment (UE). Additionally, a user device may be or include, but not limited to, a mobile device (such as a mobile phone, a smart phone, a smart watch, a tablet, a laptop computer, vehicle or other vessel (human, motor, or engine-powered, such as an automobile, a plane, a train, a ship, or a bicycle as non-limiting examples) or a fixed or stationary device, (such as a desktop computer or other computing device that is not ordinarily moved for long periods of time, such as appliances, other relatively heavy devices including Internet of things (IoT), or computing devices used in commercial or industrial environments, as non-limiting examples). In various embodiments, a user device 102 may include transceiver circuitry 106 coupled to an antenna 108 to effect wireless communication with the wireless access node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Additionally, in general, a wireless access node as described herein, such as the wireless access node 104, may include a single electronic device or apparatus, or multiple (e.g., a network of) electronic devices or apparatuses, and may comprise one or more base stations or other wireless network access points capable of communicating wirelessly over a network with one or more user devices and/or with one or more other wireless access nodes 104. For example, the wireless access node 104 may comprise a 4G LTE base station, a 5G NR base station, a 5G central-unit base station, a 5G distributed-unit base station, a next generation Node B (gNB), an enhanced Node B (eNB), or other similar or next-generation (e.g., 6G) base stations, in various embodiments. A wireless access node 104 may include transceiver circuitry 114 coupled to an antenna 116, which may include an antenna tower 118 in various approaches, to effect wireless communication with the user device 102 or another wireless access node 104. The transceiver circuitry 114 may also be coupled to one or more processors 120, which may also be coupled to a memory 122 or other storage device. The memory 122 may store therein instructions or code that, when read and executed by the processor 120, cause the processor 120 to implement one or more of the methods described herein.

In various embodiments, two communication nodes in the wireless system 100—such as a user device 102 and a wireless access node 104, two user devices 102 without a wireless access node 104, or two wireless access nodes 104 without a user device 102—may be configured to wirelessly communicate with each other in or over a mobile network and/or a wireless access network according to one or more standards and/or specifications. In general, the standards and/or specifications may define the rules or procedures under which the communication nodes can wirelessly communicate, which, in various embodiments, may include those for communicating in millimeter (mm)-Wave bands, and/or with multi-antenna schemes and beamforming functions. In addition, or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

Additionally, in the wireless system 100, the communication nodes are configured to wirelessly communicate signals between each other. In general, a communication in the wireless system 100 between two communication nodes can be or include a transmission or a reception, and is generally both simultaneously, depending on the perspective of a particular node in the communication. For example, for a given communication between a first node and a second node where the first node is transmitting a signal to the second node and the second node is receiving the signal from the first node, the first node may be referred to as a source or transmitting node or device, the second node may be referred to as a destination or receiving node or device, and the communication may be considered a transmission for the first node and a reception for the second node. Of course, since communication nodes in a wireless system 100 can both send and receive signals, a single communication node may be both a transmitting/source node and a receiving/destination node simultaneously or switch between being a source/transmitting node and a destination/receiving node.

Also, particular signals may be characterized or defined as either an uplink (UL) signal, a downlink (DL) signal, or a sidelink (SL) signal. An uplink signal is a signal transmitted from a user device 102 to a wireless access node 104. A downlink signal is a signal transmitted from a wireless access node 104 to a user device 102. A sidelink signal is a signal transmitted from a one user device 102 to another user device 102, or a signal transmitted from one wireless access node 104 to another wireless access node 104. Also, for sidelink transmissions, a first/source user device 102 directly transmits a sidelink signal to a second/destination user device 102 without any forwarding of the sidelink signal to a wireless access node 104.

Additionally, signals communicated between communication nodes in the system 100 may be characterized or defined as a data signal or a control signal. In general, a data signal is a signal that includes or carries data, such multimedia data (e.g., voice and/or image data), and a control signal is a signal that carries control information that configures the communication nodes in certain ways to communicate with each other, or otherwise controls how the communication nodes communicate data signals with each other. Also, certain signals may be defined or characterized by combinations of data/control and uplink/downlink/sidelink, including uplink control signals, uplink data signals, downlink control signals, downlink data signals, sidelink control signals, and sidelink data signals.

For at least some specifications, such as 5G NR, data and control signals are transmitted and/or carried on physical channels. Generally, a physical channel corresponds to a set of time-frequency resources used for transmission of a signal. Different types of physical channels may be used to transmit different types of signals. For example, physical data channels (or just data channels) are used to transmit data signals, and physical control channels (or just control channels) are used to transmit control signals. Example types of physical data channels include, but are not limited to, a physical downlink shared channel (PDSCH) used to communicate downlink data signals, a physical uplink shared channel (PUSCH) used to communicate uplink data signals, and a physical sidelink shared channel (PSSCH) used to communicate sidelink data signals. In addition, example types of physical control channels include, but are not limited to, a physical downlink control channel (PDCCH) used to communicate downlink control signals, a physical uplink control channel (PUCCH) used to communicate uplink control signals, and a physical sidelink control channel (PSCCH) used to communicate sidelink control signals. As used herein for simplicity, unless specified otherwise, a particular type of physical channel is also used to refer to a signal that is transmitted on that particular type of physical channel, and/or a transmission on that particular type of transmission. As an example illustration, a PDSCH refers to the physical downlink shared channel itself, a downlink data signal transmitted on the PDSCH, or a downlink data transmission. Accordingly, a communication node transmitting or receiving a PDSCH means that the communication node is transmitting or receiving a signal on a PDSCH.

Additionally, for at least some specifications, such as 5G NR, and/or for at least some types of control signals, a control signal that a communication node transmits may include control information comprising the information necessary to enable transmission of one or more data signals between communication nodes, and/or to schedule one or more data channels (or one or more transmissions on data channels). For example, such control information may include the information necessary for proper reception, decoding, and demodulation of a data signals received on physical data channels during a data transmission, and/or for uplink scheduling grants that inform the user device about the resources and transport format to use for uplink data transmissions. In some embodiments, the control information includes downlink control information (DCI) that is transmitted in the downlink direction from a wireless access node 104 to a user device 102. In other embodiments, the control information includes uplink control information (UCI) that is transmitted in the uplink direction from a user device 102 to a wireless access node 104, or sidelink control information (SCI) that is transmitted in the sidelink direction from one user device 102(1) to another user device 102(2).

Additionally, in the wireless communication system 100, a slot format for a plurality of slots (occasions) or frames may be configured by the wireless access node 104 or specified by a protocol. In some examples, a slot may be indicated or specified as a downlink slot, a flexible slot, or an uplink slot. Also, an orthogonal frequency divisional multiplexing (OFDM) symbol may be indicated or specified as a downlink symbol, a flexible symbol, or an uplink symbol, in various embodiments.

Figure 2:
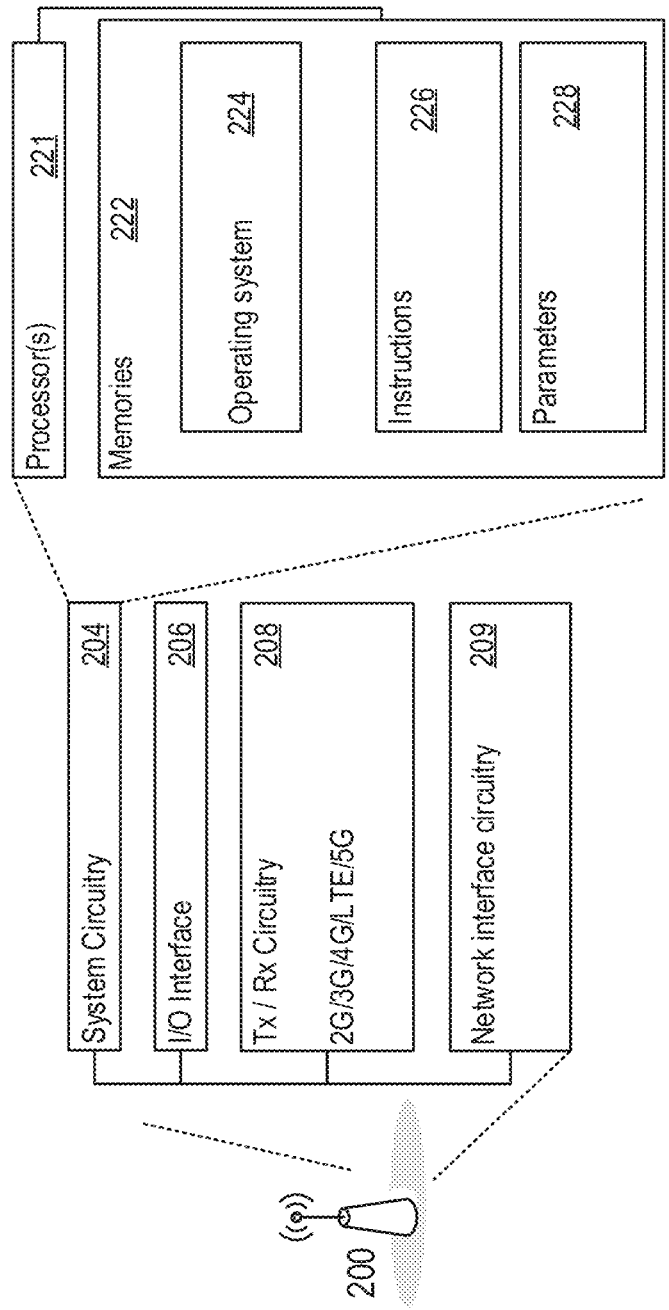
FIG. 2 shows an example of a base station.

FIG. 2 shows an example of base station 200. The example base station 200 may include radio transmitting/receiving (Tx/Rx) circuitry 208 to transmit/receive communication with UEs and/or other base stations. The base station 200 may also include network interface circuitry 209 to communicate the base station 200 with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station 200. The parameters 228 may include parameters to support execution of the instructions 226. For example, parameters may include network protocol settings, bandwidth parameters, radio frequency mapping assignments, and/or other parameters.

Figure 3:
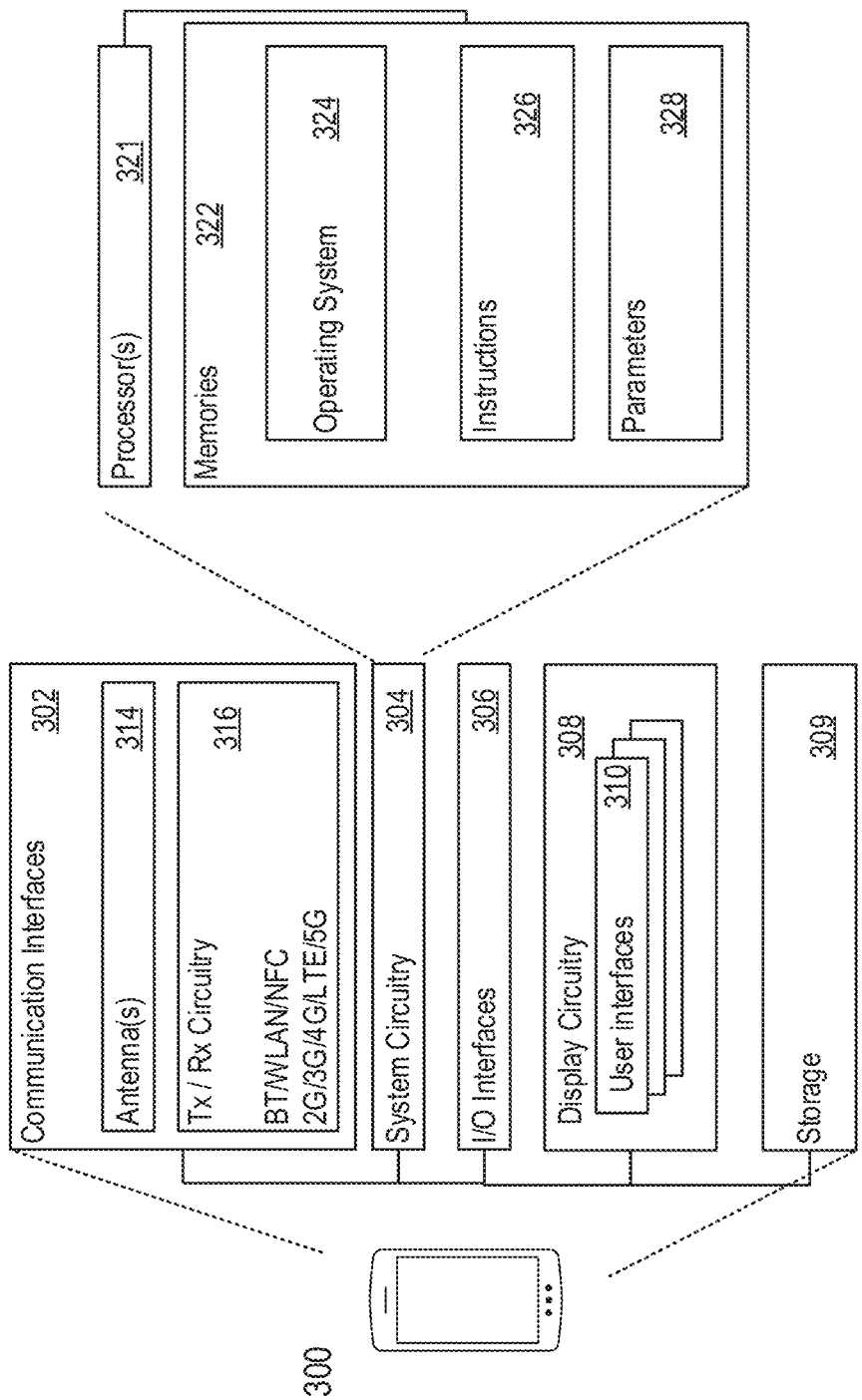
FIG. 3 shows an example of a user equipment.

FIG. 3 shows an example of a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present subject matter describes several example embodiments, which may be implemented, partly or totally, on the base station 200 and/or the UE 300 described with reference to FIGS. 1-4.

The base station 200 may configure a serving cell with one cell defining SSB (CD-SSB), and one or more non-cell defining SSB (NCD-SSB). A UE 300 may be configured with BWP in RRC CONNECTED mode with one or more downlink BWP(s). A BWP is a range of frequency resources in a frequency domain. Each of the downlink BWP(s) may be configured with CD-SSB, NCD-SSB, or neither.

The base station 200 may configure one or more serving cell measurement objects (MOs) for the UE 300. A serving cell MO may be based on a CD-SSB (legacy serving cell MO) or may be configured as a per-BWP serving cell MO, which is based on an NCD-SSB associated with the downlink BWP.

A BWP may be configured with a per-BWP serving cell MO. If a per-BWP serving cell MO is configured, when the BWP is activated, the UE 300 may perform serving cell measurement based on the per-BWP serving cell MO. Otherwise, the UE 300 may perform serving cell measurement according to the serving cell MO based on a CD-SSB.

In the conventional 3GPP TS 38.473 specification, a serving cell MO is configured by including an information element (IE) servingCellMO in the servingCellConfig IE. The per-BWP serving cell MO is configured by including the servingCellMO IE-BWP in IE BWP-DownlinkDedicated, which is configured for each downlink BWP, which is configured for a UE 300 in the RRC CONNECTED mode.

Figure 4:
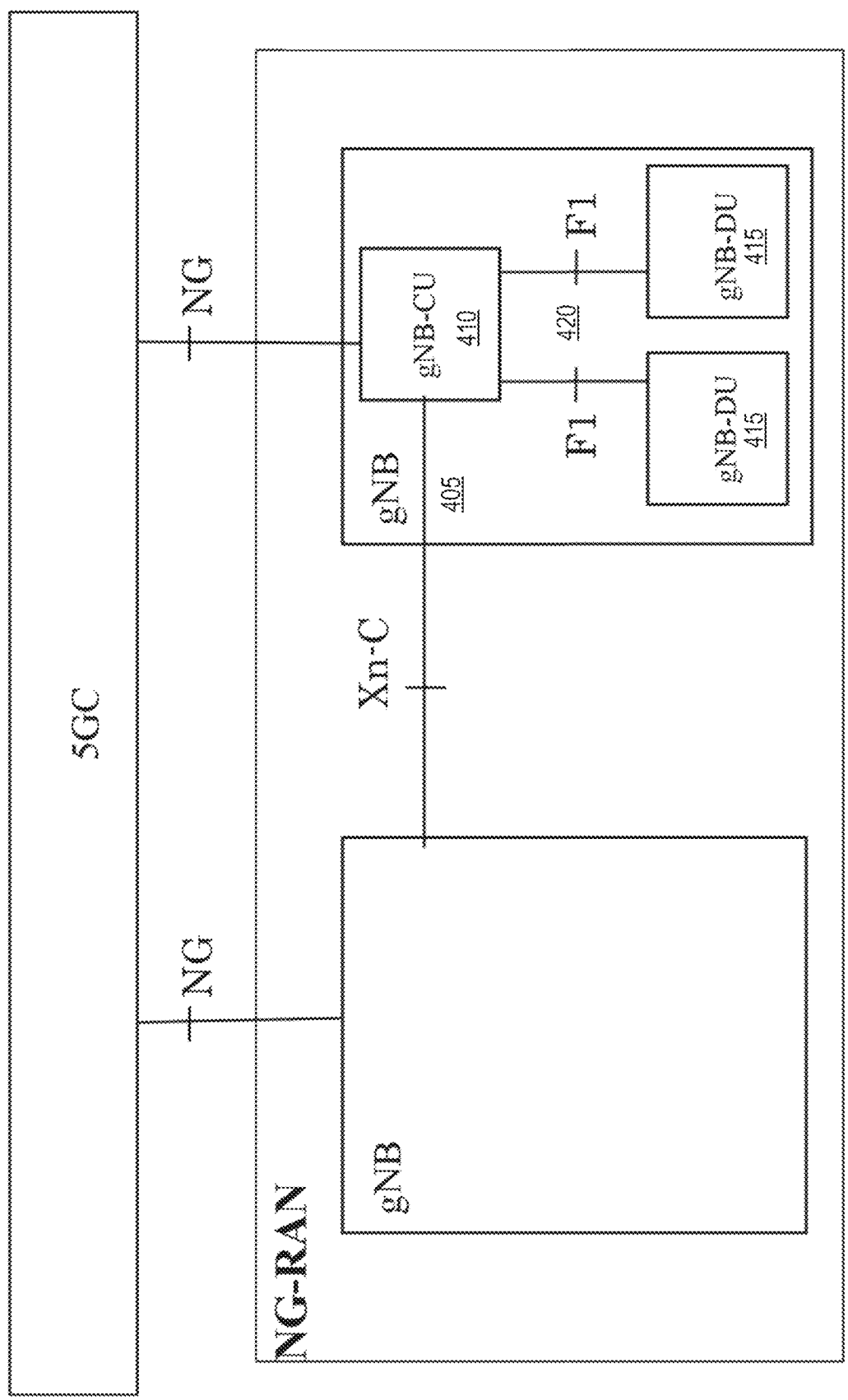
FIG. 4 shows an example of a base station.

FIG. 4 illustrates an overall architecture of a Centralized Unit (CU)/Distributed Unit (DU) split. The gNB 405 may include a gNB Central Unit (gNB-CU 410) ("CU" 410) and one or more gNB Distributed Units (gNB-DU 415) ("DU" 415). A gNB-CU 410 and a gNB-DU 415 may be connected via an F1 interface 420. The gNB-CU 410 may be defined as a logical node hosting radio resource control (RRC), SDAP and PDCP protocols of the gNB, or RRC and PDCP protocols of the en-gNB, that control the operation of the one or more gNB-DUs 415. The gNB-DU 415 may be defined as a logical node hosting RLC, MAC, and PHY layers of the gNB 405 or en-gNB, and the operation of the gNB-DU 415 may be partly controlled by the gNB-CU 410. One gNB-DU 415 may support one or more cells. One cell may be supported by only one gNB-DU 415.

In the conventional 3GPP TS 38.473 specification, the serving cell MO and measurement gap is configured using the following procedure: (1) The CU 410 configures the content of serving cell MO in the measConfig IE; (2) the CU 410 indicates the identifier (ID) of serving cell MO to the DU 415 during UE context setup or UE context modification procedure. The CU 410 may ask the DU 415 to configure the measurement gap by including measConfig IE in the UE context setup request message or the UE context modification request message. The measConfig IE includes the list of FR1 and/or FR2 frequencies for which the CU 410 requests the DU to generate the measurement gap on a per-UE or per-FR basis. The DU 415(1) configures the content of servingCellConfig IE by including the serving cell MO ID. Specifically, the DU 415 assigns the servingCellMO IE in servingCellConfig IE with a value of the serving cell MO ID that was indicated by the CU; and (2) the DU 415 configures the measurement gap according to a request by the CU 410 and fills the measurement gap information in measConfig IE. The DU 415 then includes the servingCellConfig IE and measConfig IE in the UE context setup response message or UE context modification response message to the CU 410. The CU 410 then transmits an RRC message to the UE that includes servingCellConfig IE and measConfig IE according to the corresponding IE transmitted from the DU 415 for the UE.

In accordance with the present subject matter, the issue of serving cell MO and the measurement gap configuration after introducing per-BWP serving cell MO is addressed to overcome the deficiencies of the conventional 3GPP TS 38.473 specification. Specifically, the procedure defined in the conventional 3GPP TS 38.473 specification does not consider the configuration of the per-BWP serving cell MO.

For instance, in the current 3GPP TS 38.473 specification, the CU 410 cannot indicate the per-BWP serving cell MO ID in the UE context setup request or the UE context modification request message because no such IE exists that is defined to convey it.

In the current 3GPP TS 38.473 specification, because the BWP configuration is configured by the DU 415 but not the CU 410, the CU 410 cannot know whether the DU 415 will configure downlink BWP to include an NCD-SSB for the UE 300, or which NCD-SSB will be configured for a downlink BWP when the CU 410 initiates the UE context setup or the UE context modification procedure. Accordingly, the CU 410 cannot determine whether the per-BWP serving cell MO configuration and corresponding MO ID is needed.

In the current 3GPP TS 38.473 specification, the CU 410 cannot know whether the serving cell MO based on a CD-SSB is useful when the CU 410 initiates the UE context setup or UE context modification procedure. The serving cell MO based on the CD-SSB will be applied when (1) there is a downlink BWP that includes CD-SSB, or (2) when a downlink BWP includes NCD-SSB, but per-BWP serving cell MO is not configured for this downlink BWP. In this case, the UE 300 will perform serving cell measurement based on the serving cell MO based on the CD-SSB when the downlink BWP is activated. If neither case (1) or (2) occurs, the serving cell MO based on the CD-SSB will not be applied by the UE 300. Consequently, the serving cell MO ID carried in the current UE context setup request message or the UE context modification request message is useless, but the CU 410 does not know this. The CU 410 may continue configuring the serving cell MO based on the CD-SSB to the UE 300 in an RRC message.

In the current 3GPP TS 38.473 specification, the CU 410 determines whether the measurement gap is needed based on the frequency of the serving cell measurement (i.e., frequency of CD-SSB), the frequency of the neighbor cell, and the capability of the UE 300.

After introducing the per-BWP serving cell MO, the CU 410 cannot determine which frequency of SSBs configured in the serving cell will be measured. This is because the determination depends on whether the serving cell MO based on the CD-SSB is applied, whether the per-BWP serving cell MO will be configured, and which NCD-SSB will be configured. Therefore, the CU 410 cannot simply determine whether the measurement gap is needed before BWP configuration is performed by the DU 415 for the UE.

In sum, after introducing the per-BWP serving cell MO, the approaches described in the current 3GPP TS 38.473 specification cannot provide a valid solution for configuring the serving cell MO based on the CD-SSB and NCD-SSB and cannot provide a valid solution for configuring the measurement gap.

A BWP that includes an SSB, as used herein, shall mean at least one of: (1) the SSB frequency domain resource is contained within the BWP's frequency domain resource; and/or (2) the BWP is configured with the SSB; that is, the SSB is associated with the BWP.

The terms SSB, CD-SSB, NCD-SSB, as used herein, shall all refer to an SSB burst, which is understood to carry one or more synchronization signal (SS) blocks.

According to the present subject matter, the CU 410 may indicate the candidate serving cell MOs to the DU 415, and the DU 415 may determine the configuration and/or measurement gap. In the UE context setup request message and/or UE context modification request message, which is transmitted from the CU 410 to the DU 415, the CU 410 may indicate one or more of: (1) one or more IDs of serving cell MO(s), which may be based on a CD-SSB; (2) one or more IDs of serving cell MO(s), which may be based on an NCD-SSB; and/or (3) measurement configuration that may include a list of frequencies for which the CU 410 may request that the DU 415 generate the measurement gap and measurement gap type.

The DU 415 may configure a serving cell MO ID or the per-BWP serving cell MO ID in one of the following cases.

In a first case, if a downlink BWP that includes an NCD-SSB is configured by the DU 415, and the ID of a serving cell MO based on this NCD-SSB is indicated by the CU 410, then the DU 415 may include the ID of the serving cell MO in the configuration of the downlink BWP. That is, the DU 415 may configure the per-BWP serving cell MO as the aforementioned serving cell MO based on the NCD-SSB.

In a second case, if the DU 415 configures a downlink BWP that includes an NCD-SSB, but the CU 410 does not indicate the ID of a serving cell MO based on the NCD-SSB, then the DU 415 may not configure the per-BWP serving cell MO for this downlink BWP.

In a third case, if the ID of a serving cell MO based on an CD-SSB is indicated by the CU 410, then DU 415 may follow at least one of the following rules: (1) the DU 415 may configure a downlink BWP that includes this CD-SSB; (2) the DU 415 shall configure a downlink BWP that includes this CD-SSB; and/or (3) the DU 415 may configure a downlink BWP that includes an NCD-SSB but not configure the per-BWP serving cell MO for the downlink BWP.

In a fourth case, if the ID of a serving cell MO based on a CD-SSB is not indicated by the CU 410, then: (1) the DU 415 may not configure a downlink BWP that includes a CD-SSB; and/or (2) the DU 415 may not configure a downlink BWP that includes an NCD-SSB without configuring per-BWP serving cell MO ID for the downlink BWP.

In a fifth case, if an ID of a serving cell MO based on an NCD-SSB is indicated by the CU 410, then the DU 415 may follow at least one of the following rules: (1) the DU 415 may configure a downlink BWP that includes the NCD-SSB and may configure the per-BWP serving cell MO ID for this downlink BWP; (2) the DU 415 may not configure a downlink BWP that includes the NCD-SSB; (3) the DU 415 shall configure a downlink BWP that includes this NCD-SSB and configure the per-BWP serving cell MO ID for this downlink BWP; (4) the DU 415 may not configure a downlink BWP that includes a CD-SSB; and/or (5) the DU 415 may not configure a downlink BWP that includes this NCD-SSB without configuring the per-BWP serving cell MO ID for this downlink BWP.

In a UE context setup request message or a UE context modification request message, the CU 410 may indicate one of the following preferences for configuration: (1) a CD-SSB based serving cell MO may/shall be configured for at least one downlink BWP; (2) a downlink BWP may/shall include a CD-SSB or an NCD-SSB; and/or (2) an NCD-SSB may/shall be configured for at least one downlink BWP. The preference for configuration may be indicated by the presence of the ID of a serving cell MO or may be indicated by an explicit indicator.

In response to a UE context setup request message, or a UE context modification request message, the DU 415 may respond with a UE context setup response or UE context modification response message, respectively. Within either of the aforementioned response messages, at least one of the following may be included: (1) information indicating whether the serving cell MO based on a CD-SSB is used by a BWP configured for the UE 300; and/or (2) information indicating which serving cell MO based on an NCD-SSB is configured for a BWP configured for the UE 300.

In a message between the CU 410 and the DU 415, a serving cell MO based on an NCD-SSB may be associated to a NCD-SSB with one of the following methods: (1) associate the serving cell MO ID and an NCD-SSB ID; (2) associated the serving cell MO ID and a NCD-SSB's frequency information.

In a message between the CU 410 and the DU 415, a serving cell MO based on an NCD-SSB may be identified with one of following methods: (1) the ID of the NCD-SSB which associated to the serving cell MO; (2) the frequency information of the NCD-SSB which is associated to the serving cell MO; (3) a measurement object ID (MO ID).

Additionally, the DU 415 may determine the measurement gap if measConfig IE is included in a UE context setup request message or a UE context modification request message. The DU 415 may determine the measurement gap based on one or more of the following: (1) the information included in the measConfig IE; (2) the results of which serving cell MO is used by the UE 300 according to the techniques disclosed in accordance with the present subject matter, such as (a) whether a CD-SSB-based serving cell MO is configured for a BWP of the UE 300; and/or (b)

which NCD-SSB-based serving cell MO is configured for a BWP of the UE 300. Subsequently, the DU 415 may include the measurement gap configuration in measConfig that is included in the response message.

Upon reception of the response message, the DU 415 may perform the following operations. For a serving cell MO that is not configured for any BWP of the UE 300, the CU 410 may remove it from a measConfig IE, or the CU 410 may not include the serving cell MO within a measConfig IE. The measConfig IE may be transmitted to the UE 300 in an RRC message.

The DU 415 may configure the BWP according to various factors, including UE 300 capability. In this example, the preference and/or candidate serving cell MO information provided by the CU 410 may also be considered by the DU 415. After configuring for the UE 300, the DU 415 may inform the CU 410 which serving cell MO is used or not used. The CU 410 may then remove the candidate serving cell(s) MO that is not configured for the UE 300. Simultaneously, the DU 415 may also determine the measurement gap based on the results of the serving cell MO configuration and the measurement configuration provided by the CU 410. Thus, only one step, including one request and one response, is needed to complete the serving cell MO configuration and measurement gap configuration.

Alternatively, or in addition, the DU 415 may indicate the BWP configuration to the CU 410, and the CU 410 may configure the serving cell measurement objects. In a message that may be sent from the DU 415 to the CU 410, such as a UE context setup response message or a UE context modification response message, the DU 415 may indicate the BWP configuration information of a UE 300 to the CU 410. The BWP configuration information may include at last one of: (1) whether a BWP exists that includes a CD-SSB; (2) the information of the BWP that includes a CD-SSB and may further include at least one of (a) the BWP ID of the BWP; and/or (b) the type of the BWP, such as the first active BWP, initial downlink BWP, Reduced Capacity (RedCap) specific initial downlink BWP, or default BWP; and/or (3) the information of the BWP that includes an NCD-SSB and may further include one or more of the quantity of this type of BWP, the BWP ID of this type of BWP, and/or the information of the NCD-SSB that is included in the BWP, such as the ID of the NCD-SSB, the frequency of the NCD-SSB, or other information used for the CU 410 to identify the NCD-SSB.

The DU 415 may also indicate to the CU 410 the preference of per-BWP serving cell MO configuration. The preference may be one of the following: (1) prefer to configure a per-BWP serving cell MO for BWP that includes an NCD-SSB, or (2) prefer not to configure a per-BWP serving cell MO for a BWP that includes an NCD-SSB.

The CU 410 may configure a serving cell MO configuration for the UE 300 based on the BWP configuration information sent from the DU 415 to the CU 410. The CU 410 may indicate a configured serving cell MO information to the DU 415 in a subsequent message; e.g., a UE context modification request message. The UE context modification request message may include on or more of: (1) an ID of a serving cell MO that is based on a CD-SSB; and/or (2) an ID of a serving cell MO that is based on an NCD-SSB.

Upon reception of the serving cell MO configuration, the DU 415 may configure the serving cell MO ID for the UE 300 according to the serving cell MO configuration information. If the ID of the serving cell MO based on a CD-SSB is included in the UE context modification request message, the DU 415 may configure the serving cell MO IE included in a servingCellConfig IE accordingly (i.e., the DU 415 may configure servingCellMO IE carried in servingCellConfig IE accordingly). If the ID of the serving cell MO based on an NCD-SSB is included, the DU 415 may configure a per-BWP serving cell MO for the BWP that includes the NCD-SSB (i.e., servingCellMO-BWP in IE BWP-DownlinkDedicated of the BWP may be assigned to the ID of the serving cell MO).

Using this technique in accordance with the present subject matter, the DU 415 may first inform the CU 410 of the BWP configuration information. The BWP configuration information may include whether a CD-SSB is configured for a downlink BWP of the UE 300, whether an NCD-SSB is configured (i.e., included) in a downlink BWP of the UE 300, or some other detailed information of the corresponding BWP.

The CU 410 may then configure the serving cell MO, either based on a CD-SSB or an NCD-SSB according to the BWP configuration information. The CU 410 may indicate the serving cell MO ID of the configured serving cell MO to the DU 415.

Thus, the DU 415 may finish the serving cell MO configuration for both a legacy serving cell MO that is based on a CD-SSB and the per-BWP serving cell MO that is based on an NCD-SSB.

Further, the CU 410 may have complete information of the serving cell MO configuration after determining the configuration of the serving cell MO based on the BWP configuration information provided by the DU 415. The CU 410 may determine whether measurement is needed and whether to request the DU 415 to generate a measurement gap.

In the conventional NR system, System Information (SI) can be categorized as master information block (MIB), SI Block 1 (SIB1), and other SI. The UE 300 receives other SI by monitoring PDCCH occasions defined by search space. The search space used for receiving other SI may be the search space zero (i.e., searchSpaceZero) or other SI search space (i.e., searchSpaceOtherSystemInformation) if it is configured. The search space used for SIB1 reception is the search space zero.

Upon handover, the SI of the target cell may be acquired by the UE 300 by one of the following methods: (1) the UE 300 monitors the PDCCH occasions according to common search space for SI reception configuration; and/or (2) the target cell delivers SI to the UE 300 via a dedicated RRC message.

In the conventional NR system, a RedCap UE may be configured with a downlink BWP that has no common search space for SI (including SIB1 and other SI) reception.

During the handover procedure, the UE will activate the first active downlink BWO of the target cell and initiate RACH procedure in the first active downlink BWP. However, the first active downlink BWP may be configured such that it is not configured with common search space for SI reception. Thus, the UE 300 cannot acquire target cell's SI by monitoring PDCCH occasions in the first active downlink BWP of the target cell.

To facilitate the handover procedure, the base station 200 must transmit SI to the UE 300 via a dedicated RRC message in this case.

However, in the CU/DU architecture, the BWP configuration is determined by the DU 415, while dedicated RRC message is constructed by CU 410, and whether to include the SI in the RRC message is determined by CU 410. To determine whether it is necessary to include SI in the dedicated message, the CU 410 needs to know the configuration of first active downlink BWP for the UE 300.

To address these issues in accordance with the present subject matter, the CU 410 may first request the DU 415 setup UE context by transmitting a UE context setup request message during the handover procedure. The DU 415 may configure the serving cell configuration, including BWP configuration. The BWP configuration may include a first active downlink BWP configuration.

Where the first active downlink BWP does not include a CD-SSB or Control Resource Set (CORSET) zero, the DU 415 may not configure a common search space for SI reception.

Subsequently, the DU 415 may indicate to the CU 410 one of the following in the UE context setup response message: (1) dedicated SI delivery is needed; (2) the first active downlink BWP does not include CD-SSB; (3) the first active downlink BWP is not configured with common search space for SI reception (i.e., search space zero or search space for other SI); and/or (4) the first active downlink BWP is a RedCap-specific initial downlink BWP.

The CU 410 may then include SI (SIB1 and/or other SI) in a dedicated RRC message that may be transmitted to the UE 300. The dedicated RRC message may be the RRC reconfiguration message used for handover.

Using this technique in accordance with the present subject matter, the CU 410 may be informed as to whether dedicated SI delivery is needed for the UE 300. The UE 300 may acquire SI without monitoring PDCCH occasions when the first active BWP is not configured with a common search space for receiving SI.

According to the present subject matter, during a UE context setup or UE modification procedure, the CU 410 may provide a list of candidate serving cell MO IDs to the DU 415. The DU 415 may configure a per-BWP serving cell MO according to the candidate serving cell MO ID. The CU 410 may also indicate a preference on the per-BWP serving cell MO configuration. The DU 415 may indicate the serving cell MO that is used for the UE 300 to the CU 410. The DU 415 may determine a measurement gap based on the measConfig IE transmitted from the CU 410 and the determination of per-BWP serving cell MO configuration. The CU 410 may remove the candidate serving cell MO that is not used by the UE 300 from measConfig IE. During a UE context setup or modification procedure, the DU 415 may inform the CU 410 of the BWP configuration; e.g., whether there is a BWP that includes an NCD-SSB. The CU 410 may configure a serving cell MO according to the per-BWP serving cell MO configuration. The DU 415 may indicate the preference of the configuration of a per-BWP serving cell MO. During handover, in case the first active downlink BWP is not configured with a common search space for SI, the DU 415 may inform the CU 410 that dedicated SI delivery is needed for the UE 300. The CU 410 may then include SI in a dedicated RRC message to the UE 300.

The present subject matter describes methods, apparatus, and computer-readable medium for wireless communication. The present subject matter addressed the issues with scheduling multiple transmissions with one or more cells by reducing the number of bits needed to indicate scheduled transmissions. The methods, devices, and computer-readable medium described in the present subject matter may facilitate the performance of wireless transmission between a user equipment and a base station 200, thus improving efficiency and overall performance. The methods, devices, and computer-readable medium described in the present subject matter may improves the overall efficiency of the wireless communication systems.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

The subject matter of the disclosure may also relate to or include, among others, the following aspects:

A first aspect includes a method for measurement configuration in a wireless communication network, comprising: providing a plurality of candidate serving cell measurement object (MO) identifiers (IDs) from a centralized unit (CU) to a distributed unit (DU); selecting, by the DU, a serving cell MO from the plurality of candidate serving cell MO IDs to be used for a user equipment (UE); and configuring, by the DU, a per-bandwidth part (BWP) serving cell MO configuration according to the serving cell MO.

A second aspect includes the method of aspect 1, further comprising: indicating, by the CU, a preference on the serving cell MO configuration.

A third aspect includes the method of aspects 1 or 2, further comprising: determining, by the DU, a measurement gap based on the per-BWP serving cell MO configuration.

A fourth aspect includes the method of any preceding aspect, further comprising: removing, by the CU, a candidate serving cell MO that was not selected by the DU from a measConfig IE.

A fifth aspect includes the method of any preceding aspect, wherein the plurality of candidate serving cell MO IDs are provided in a UE context setup request message or UE modification request message sent from the CU to the DU.

A sixth aspect includes the method of any preceding aspect, further comprising: responding, by the DU, to the UE context setup request message or UE modification request message with a response message comprising at least one of: whether the serving cell MO is based on a cell defining synchronization signal block (CD-SSB) that is configured by a BWP configured for the UE; or whether the serving cell MO is based on a non-cell defining synchronization signal block (NCD-SSB) that is configured for a BWP configured for the UE.

A seventh aspect includes the method of any preceding aspect, wherein one or more candidate serving cell MO IDs are based on a cell-defining synchronization signal block (CD-SSB).

An eighth aspect includes the method of any preceding aspect, wherein one or more candidate serving cell MO IDs are based on a non-cell-defining synchronization signal block (NCD-SSB) indicated by the CU.

A ninth aspect includes the method of any preceding aspect, wherein the step of configuring the per-BWP serving cell MO configuration is further based on the NCD-SSB.

A tenth aspect includes the method of any preceding aspect, wherein the plurality of candidate serving cell MO IDs are based on a measurement configuration comprising a list of frequencies for which the CU requests that the DU generate the measurement gap and measurement gap type.

An eleventh aspect includes the method of any preceding aspect, further comprising: configuring, by the DU, a downlink BWP.

A twelfth aspect includes the method of any preceding aspect, wherein the downlink BWP includes an NCD-SSB; and the method further comprises: configuring the per-BWP serving cell MO configuration based on the NCD-SSB.

A thirteenth aspect includes the method of any preceding aspect, wherein the CU does not indicate an ID of a serving cell MO based on an NCD-SSB; and the method further comprises: not configuring, by the DU, a per-BWP serving cell MO configuration for the configured downlink BWP.

A fourteenth aspect includes the method of any preceding aspect, further comprising: configuring, by the DU, a downlink BWP that includes the CD-SSB.

A fifteenth aspect includes the method of any preceding aspect, further comprising: configuring, by the DU, a downlink BWP that includes an NCD-SSB; and not configuring, by the DU, a per-BWP serving cell MO for the configured downlink BWP.

A sixteenth aspect includes the method of any preceding aspect, wherein an ID of a serving cell MO based on a CD-SSB is not indicated by the CU; and the method further comprises: not configuring, by the DU, a downlink BWP that includes the CD-SSB.

A seventeenth aspect includes the method of any preceding aspect, wherein an ID of a serving cell MO based on a CD-SSB is not indicated by the CU; and the method further comprises: configuring, by the DU, a downlink BWP that includes an NCD-SSB; and configuring a per-BWP serving cell MO ID for the downlink BWP.

An eighteenth aspect includes the method of any preceding aspect, further comprising: configuring, by the DU, a downlink BWP that includes the NCD-SSB; and configuring, by the DU, a per-BWP serving cell MO ID for the downlink BWP.

A nineteenth aspect includes the method of any preceding aspect, further comprising: not configuring, by the DU, a downlink BWP that includes the NCD-SSB.

A twentieth aspect includes the method of any preceding aspect, further comprising: not configuring, by the DU, a downlink BWP that includes a CD-SSB.

A twenty-first aspect includes the method of any preceding aspect, further comprising: configuring, by the DU, a downlink BWP that includes the NCD-SSB; and configuring a per-BWP serving cell MO ID for the downlink BWP.

A twenty-second aspect includes the method of any preceding aspect, wherein the preference is a CD-SSB-based serving cell MO configured to a downlink BWP that comprises a CD-SSB or an NCD-SSB.

A twenty-third aspect includes the method of any preceding aspect, wherein the preference is an NCD-SSB-based serving cell MO configured to a downlink BWP.

A twenty-fourth aspect includes the method of any preceding aspect, wherein the serving cell MO ID is indicated by the CU with one or more of: an NCD-SSB identifier that is associated with the serving cell MO; a frequency information of the NCD-SSB that is associated with the serving cell MO; or an MO ID.

A twenty-fifth aspect includes the method of any preceding aspect, wherein the measurement gap is determined based further on: information included in the measConfig IE; whether a CD-SSB-based serving cell MO is configured for a BWP of the UE; and whether and which of an NCD-SSB-based serving cell MO is configured by the BWP of the UE.

A twenty-sixth aspect includes the method of any preceding aspect, wherein upon reception, by the CU, of the response message: not including, by the CU, an unselected candidate serving cell within an IE measConfig; and transmitting the IE measConfig to the UE in a radio resource control (RRC) message.

A twenty-seventh aspect includes a method for measurement configuration in a wireless communication network, comprising: transmitting a message from a DU to a CU that indicates a BWP configuration information of a UE; transmitting, by the CU, a serving cell MO configuration to the DU; and configuring, by the DU, a serving cell MO identifier for the UE according to the serving cell MO configuration.

A twenty-eighth aspect includes the method of aspect 27, further comprising: indicating, by the DU, a preference of per-BWP serving cell MO configuration to the CU; and configuring, by the CU, the serving cell MO configuration for the UE based on the message indicating the BWP configuration information.

A twenty-ninth aspect includes the method of aspects 27 or 28, wherein the message is: a UE context setup response message; or a UE context modification response message.

A thirtieth aspect includes the method of any one of aspects 27-29, wherein the BWP configuration information comprises at least one of: whether a BWP includes a CD-SSB; a BWP identifier of the BWP; a type of the BWP; a quantity of the type of the BWP; a BWP identifier of the type of the BWP; an identifier of an NCD-SSB; or a frequency of the NCD-SSB.

A thirty-first aspect includes the method of any one of aspects 27-30, wherein the preference comprises one or more of: a preference to configure the per-BWP serving cell MO for BWP that includes NCD-SSB; or a preference not to configure the per-BWP serving cell MO for BWP that includes NCD-SSB.

A thirty-second aspect includes the method of any one of aspects 27-31, further comprising: indicating, by the CU, configured serving cell MO information to the DU in a UE context modification request message.

A thirty-third aspect includes the method of any one of aspects 27-32, wherein the UE context modification request message comprises at least one of: an identifier of a serving cell MO based on a CD-SSB; or an identifier of a serving cell MO based on an NCD-SSB.

A thirty-fourth aspect includes the method of any one of aspects 27-33, wherein the serving cell MO identifier is based on a CD-SSB, and the method further comprises: configuring, by the DU, the serving cell MO IE based on the CD-SSB.

A thirty-fifth aspect includes the method of any one of aspects 27-34, wherein the serving cell MO is based on an NCD-SSB, and the method further comprises: configuring, by the DU, the per-BWP serving cell MO configuration for a BWP that includes the NCD-SSB.

A thirty-sixth aspect includes a method for measurement configuration in a wireless communication network, comprising: transmitting, by a CU, a UE context setup response message to a DU, wherein the UE context setup response message comprises at least one of: dedicated system information delivery is needed; an active downlink BWP does not include a CD-SSB; the active downlink BWP is not configured with a common search space for System Information reception; or the active downlink BWP is a reduced capacity (RedCap)-specific initial downlink BWP.

A thirty-seventh aspect includes the method of aspect 36, wherein the BWP configuration comprises: the active downlink BWP configuration.

A thirty-eighth aspect includes the method of aspects 36 or 37, further comprising: configuring, by the DU, a serving cell configuration comprising a BWP configuration; indicating, by the DU, a UE context setup response message to the CU; and transmitting, by the CU, a dedicated RRC message to the UE including System Information (SI).

A thirty-ninth aspect includes the method of any one of aspects 36-38, wherein the dedicated RRC message is an RRC reconfiguration message for handover.

A fortieth aspect relates to a device for wireless communication comprising: a processor; and a memory in communication with the processor, the memory storing a plurality of instructions executable by the processor to cause the device to: implement the method of any preceding aspect.

A forty-first aspect relates to a non-transitory computer-readable medium comprising instructions operable, when executed by one or more processors, to: implement the method of any one of aspects 1-39.

The invention claimed is:

1. A method for measurement configuration in a wireless communication network, comprising:
receiving, by a distributed unit (DU), a list of candidate serving cell measurement object (MO) identifiers (IDs) from a centralized unit (CU);
selecting, by the DU, a serving cell MO from the list of candidate serving cell MO IDs to be used for a user equipment (UE); and
configuring, by the DU, a serving cell MO configuration for a bandwidth part (BWP) according to the serving cell MO.

2. The method of claim 1, wherein
the list of candidate serving cell MO IDs are provided in a UE context setup request message or a UE context modification request message sent from the CU to the DU.

3. The method of claim 2, further comprising:
transmitting, by the DU, a response message to the UE context setup request message or the UE context modification request message, wherein the response message comprises information indicating:
which serving cell MO based on a non-cell defining synchronization signal block (NCD-SSB) is configured for a BWP configured for the UE.

4. The method of claim 3, wherein
the response message comprises the serving cell MO configuration for the BWP, wherein
the serving cell MO configuration for the BWP is comprised in a serving cell MO information element (IE), the serving cell MO IE is comprised in a servingCellConfig IE.

5. The method of claim 1, wherein
one or more candidate serving cell MO IDs are based on a non-cell-defining synchronization signal block (NCD-SSB) indicated by the CU to the DU.

6. The method of claim 5, wherein
the one or more candidate serving cell MO IDs are indicated by the CU to the DU with:
a frequency information of the NCD-SSB that is associated with the serving cell MO.

7. The method of claim 1, further comprising:
configuring, by the DU, a downlink BWP.

8. The method of claim 7, wherein
the downlink BWP includes an NCD-SSB; and the method further comprises:
configuring, by the DU, the serving cell MO configuration for the BWP based on the NCD-SSB.

9. A method for measurement configuration in a wireless communication network, comprising:
transmitting, by a centralized unit (CU) to a distributed unit (DU), a list of candidate serving cell measurement object (MO) identifiers (IDs); and
receiving, by the CU from the DU, information indicating which serving cell MO is configured for a bandwidth part (BWP) configured for a UE, and the information is based on a list of candidate serving cell MO IDs.

10. The method of claim 9, wherein the list of candidate serving cell MO IDs are transmitted in a UE context setup request message or a UE context modification request message from the CU to the DU.

11. The method of claim 9, wherein the information indicating the configured serving cell MO comprises a serving cell MO configuration for a BWP, and
the serving cell MO configuration for the BWP is transmitted in a UE context setup response message or a UE context modification response message from the DU to the CU.

12. The method of claim 9, wherein
one or more candidate serving cell MO IDs are based on a non-cell-defining synchronization signal block (NCD-SSB) indicated by the CU.

13. The method of claim 9, wherein the configured serving cell MO is related with:
a frequency information of the NCD-SSB that is associated with the serving cell MO.

14. The method of claim 9, further comprising:
configuring, by the CU, a serving cell MO configuration for the UE based on the serving cell MO configuration for the BWP; or
transmitting, by the CU, a dedicated RRC message to the UE including the serving cell MO configuration.

15. A device for wireless communication comprising:
at least one processor; and
a memory in communication with the at least one processor, the memory storing a plurality of instructions executable by the at least one processor to cause the device to:
implement the method of claim 1.

16. A device for wireless communication comprising:
at least one processor; and
a memory in communication with the at least one processor, the memory storing a plurality of instructions executable by the at least one processor to cause the device to:
implement the method of claim 9.

* * * * *